United States Patent
Mori et al.

(10) Patent No.: US 11,352,818 B2
(45) Date of Patent: Jun. 7, 2022

(54) EXTERNAL LOCKING DEVICE

(71) Applicant: Panasonic Intellectual Property Management Co., Ltd., Osaka (JP)

(72) Inventors: Takeshi Mori, Osaka (JP); Ryusuke Teramoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 536 days.

(21) Appl. No.: 16/537,589

(22) Filed: Aug. 11, 2019

(65) Prior Publication Data

US 2019/0360241 A1    Nov. 28, 2019

Related U.S. Application Data

(63) Continuation of application No. PCT/JP2018/005678, filed on Feb. 19, 2018.

(30) Foreign Application Priority Data

Feb. 24, 2017    (JP) .............................. JP2017-034001

(51) Int. Cl.
   *E05B 73/00*     (2006.01)
   *G06F 1/16*      (2006.01)
(52) U.S. Cl.
   CPC ........ *E05B 73/0082* (2013.01); *G06F 1/1613* (2013.01)
(58) Field of Classification Search
   CPC .... E05B 73/0082; E05B 63/24; E05B 65/006; E05B 65/0067; E05B 15/0053;
   (Continued)

(56) References Cited

U.S. PATENT DOCUMENTS

2009/0140618 A1   6/2009   Kodaira
2012/0212910 A1*  8/2012   Katsuta ................. G06F 1/1616
                                              361/747
(Continued)

FOREIGN PATENT DOCUMENTS

| JP | 11-338578 A    | 12/1999  |
| JP | 2009-134553 A  | 6/2009   |
| JP | 2013-204258 A  | 10/2013  |

OTHER PUBLICATIONS

International Search Report for corresponding Application No. PCT/JP2018/005678, dated Apr. 10, 2018.

*Primary Examiner* — Nelson M Rosario
(74) *Attorney, Agent, or Firm* — Renner, Otto, Boisselle & Sklar, LLP

(57) ABSTRACT

An external locking device is mounted on a holder. An operation member of the holder is moved between a first position where the operation member is substantially flush with an exterior of the holder and a second position where the operation member protrudes from the exterior. A first electronic device is detached from the holder when the operation member moved to the second position. The external locking device includes a locking member, a shaft member that rotates to a locking position during locking of the locking member and rotates to an unlocking position during unlocking of the locking member, and a moving member. When the shaft member is located at the locking position, the moving member moves to a space where the operation member is to be located at the second position. When the shaft member is located at the unlocking position, the moving member retreats from the space.

2 Claims, 15 Drawing Sheets

(58) Field of Classification Search
CPC ........ G06F 1/16; G06F 1/1613; G06F 1/1616; G06F 1/1626; G06F 1/1632; G06F 1/1656; G06F 1/1654; G06F 1/1679; G06F 2200/1633; E05C 3/04; H05K 5/03
See application file for complete search history.

(56) References Cited

U.S. PATENT DOCUMENTS

2014/0184496 A1* 7/2014 Gribetz ............... G06F 3/04842
345/156
2015/0378399 A1* 12/2015 Grinstead ............. G06F 1/1681
361/679.09

* cited by examiner

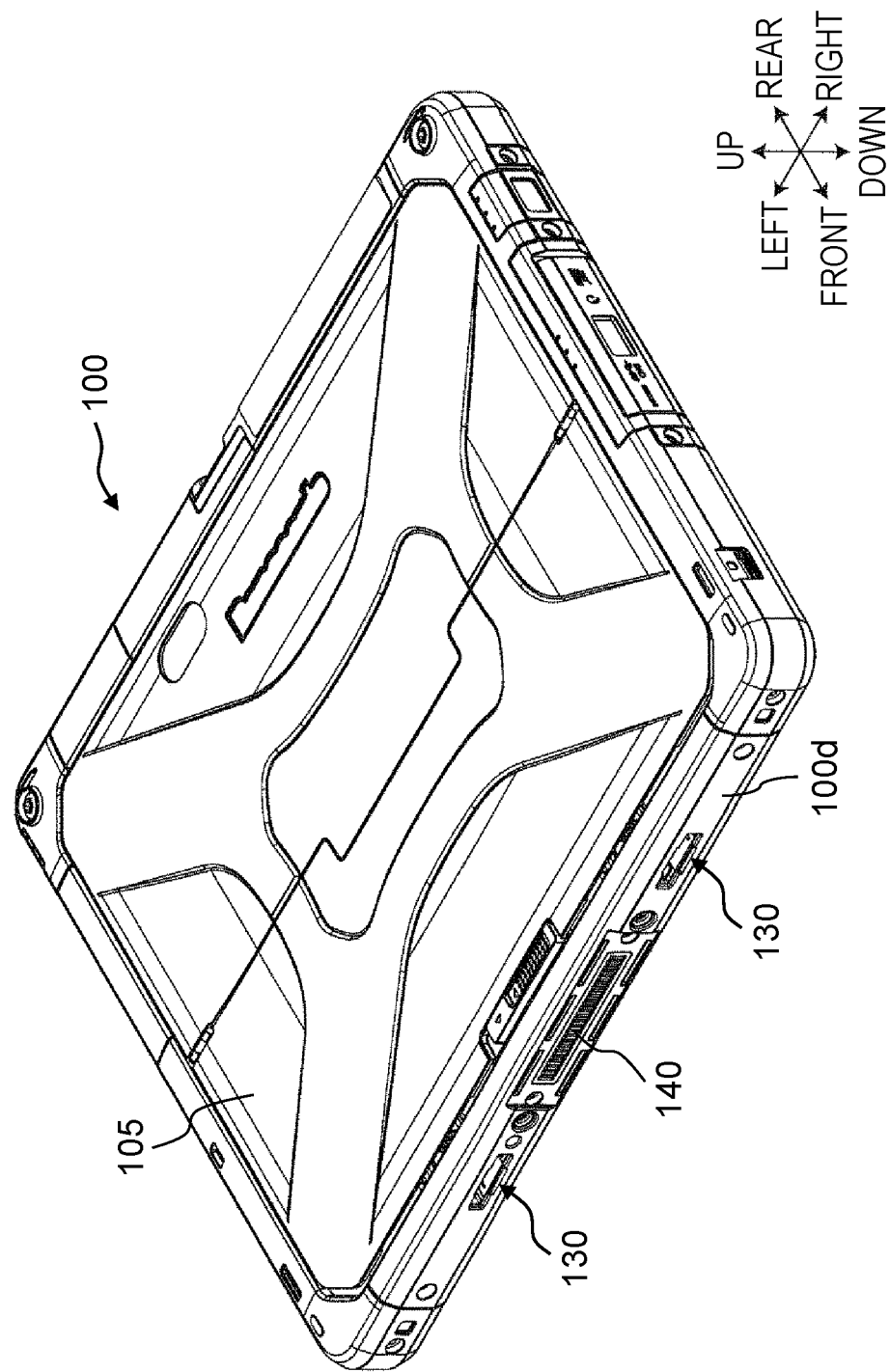

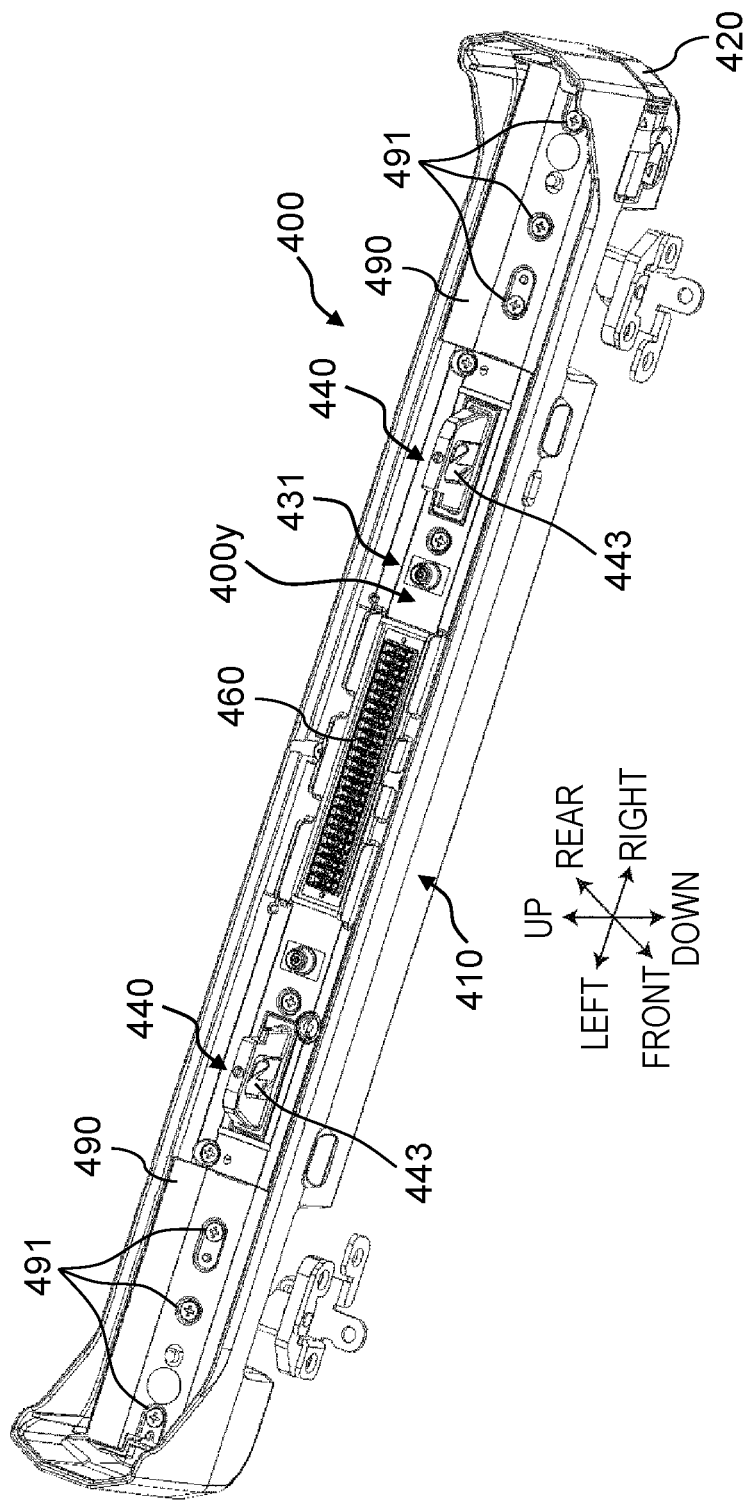

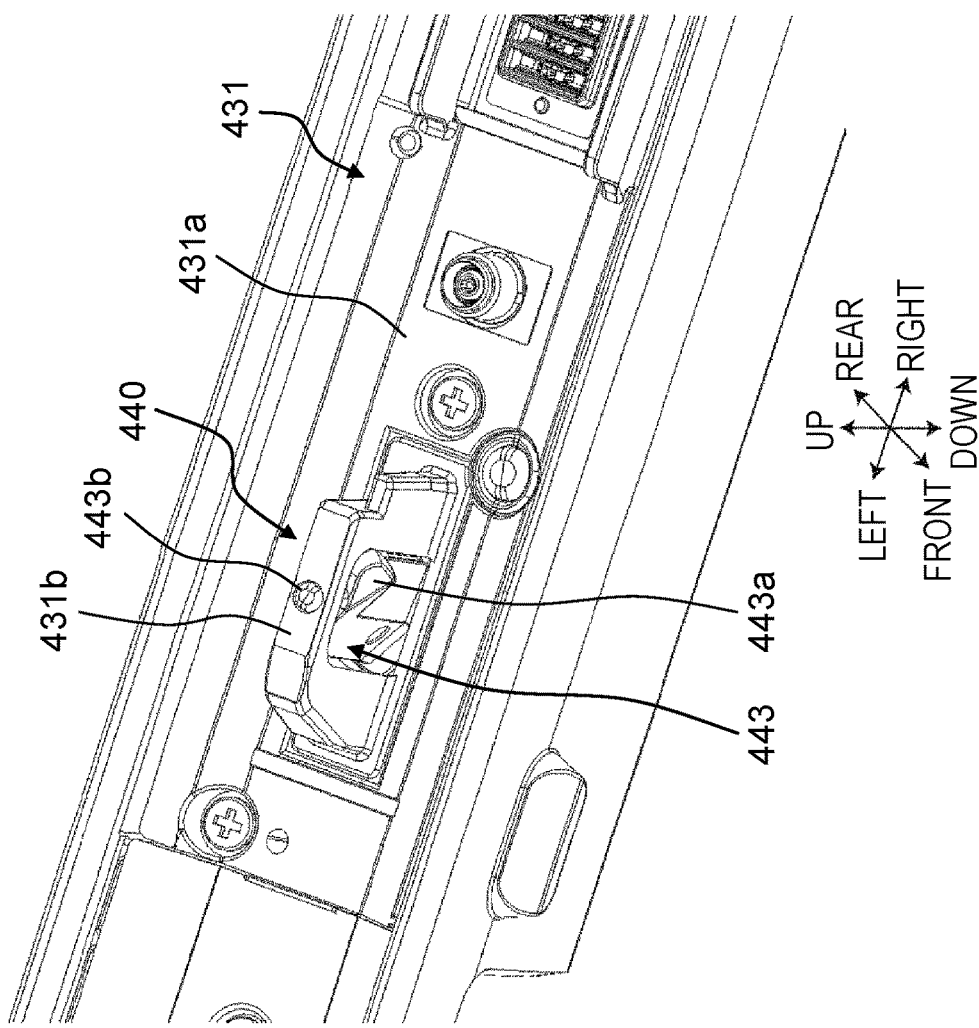

EXTERNAL LOCKING DEVICE

BACKGROUND

1. Technical Field

The present disclosure relates to an external locking device mounted on a holder of a second electronic device, to which a first electronic device is detachably attached.

2. Description of the Related Art

PTL 1 discloses a structure which prevents a battery attached to a portable computer from being detached when the portable computer is locked by a Kensington lock.

Here, PTL 1 is Unexamined Japanese Patent Publication No. 2009-134553.

SUMMARY

The present disclosure provides an external locking device that makes it impossible to detach a first electronic device attached to a holder of a second electronic device without using a Kensington lock.

An external locking device of the present disclosure is mounted on a holder of a second electronic device, the holder being detachably attached with a first electronic device.

The holder includes an operation member for detaching the first electronic device from the holder.

The operation member is moved between a first position where the operation member is substantially flush with an exterior of the holder and a second position where the operation member protrudes from the exterior of the holder.

The holder causes the first electronic device to be detached from the holder when the operation member is operated to move from the first position to the second position.

The external locking device includes a locking member, a shaft member that rotates to a locking position during locking of the locking member and rotates to an unlocking position during unlocking of the locking member, and a moving member coupled to the shaft member.

When the shaft member is located at the locking position, the moving member moves to a space where the operation member is to be located at the second position. When the shaft member is located at the unlocking position, the moving member retreats from the space.

By the technique in the present disclosure, it is impossible to detach a first electronic device attached to a holder of a second electronic device without using a Kensington lock.

BRIEF DESCRIPTION OF DRAWINGS

FIG. 4 is a perspective view of a rear side of the tablet unit.

FIG. 5A is a perspective view of a holder and illustrates a state in which engagement members are located at first rotational positions.

FIG. 5B is an enlarged perspective view of the engagement member when the engagement member is located at the first rotational position.

DETAILED DESCRIPTION

Hereinafter, exemplary embodiments will be described in detail with reference to the drawings as appropriate. However, more detailed description than necessary may be omitted in some cases. For example, a detailed description of a well-known matter and a duplicated description of substantially the same configuration will be omitted in some cases. This is to avoid the following description from being unnecessarily redundant, and to facilitate understanding of those skilled in the art.

The inventor of the present disclosure provides the appended drawings and the following description in order to allow those skilled in the art to fully understand the present disclosure, and does not intend to limit the subject matter described in the appended claims by the appended drawings and the following description.

First Exemplary Embodiment

A first exemplary embodiment will be described below with reference to the drawings.
[1. Configuration]
[1-1. Outline]

Figure 1:
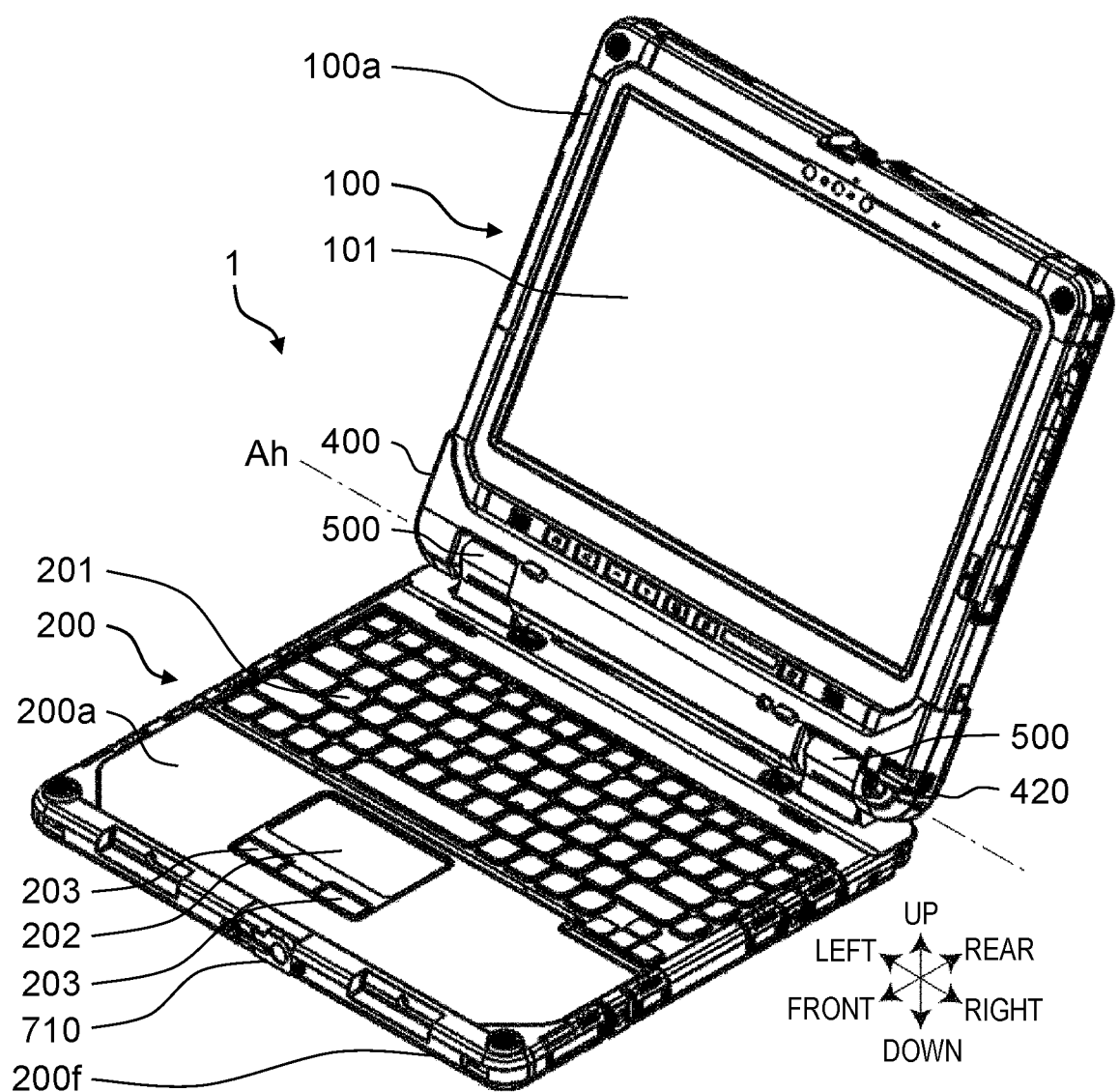
FIG. 1 is a perspective view of a computer according to a first exemplary embodiment and illustrates a state in which a tablet unit is opened.
Figure 2:
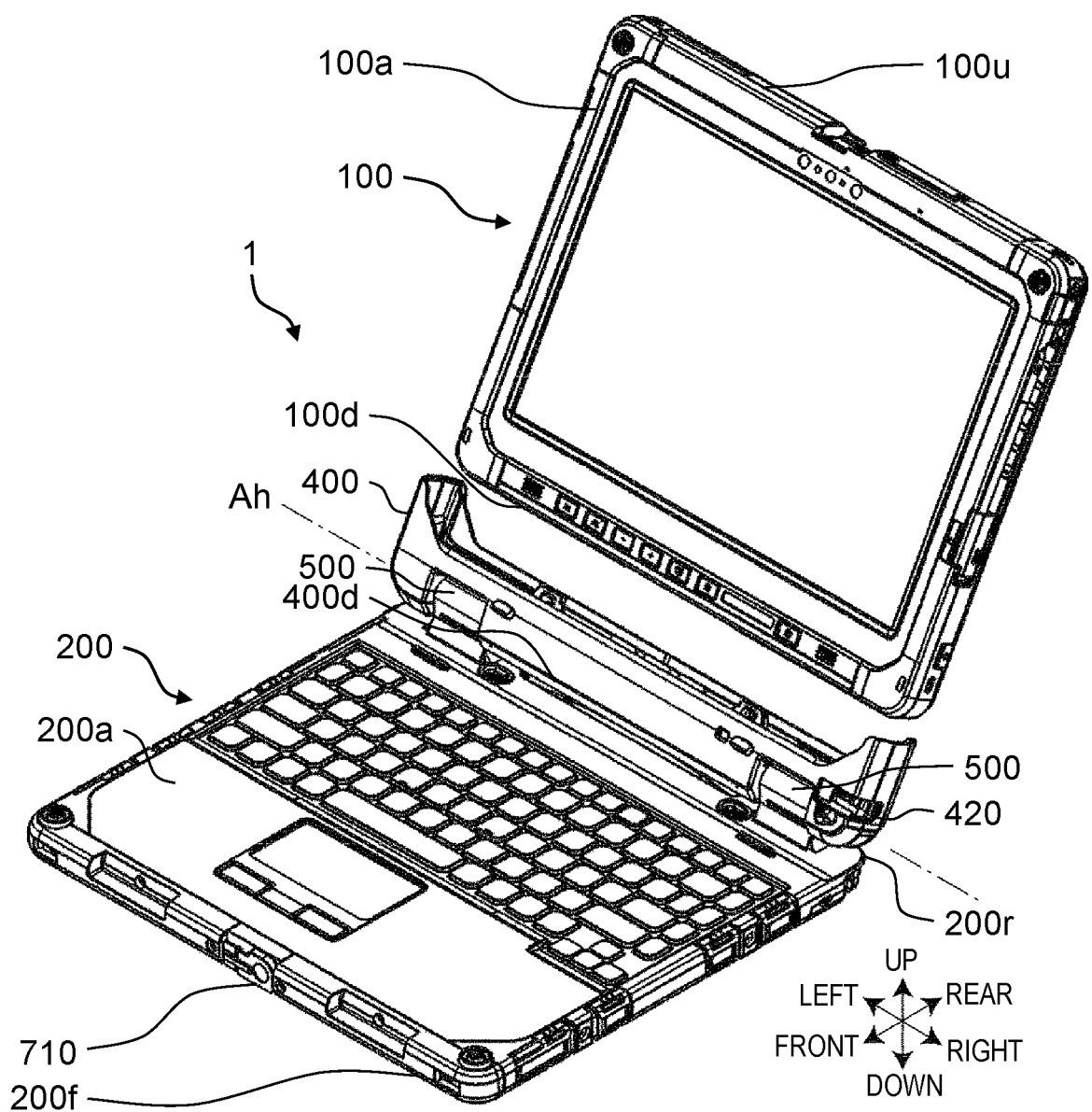
FIG. 2 is a perspective view of the computer and illustrates a state in which the tablet unit is detached.
Figure 3:
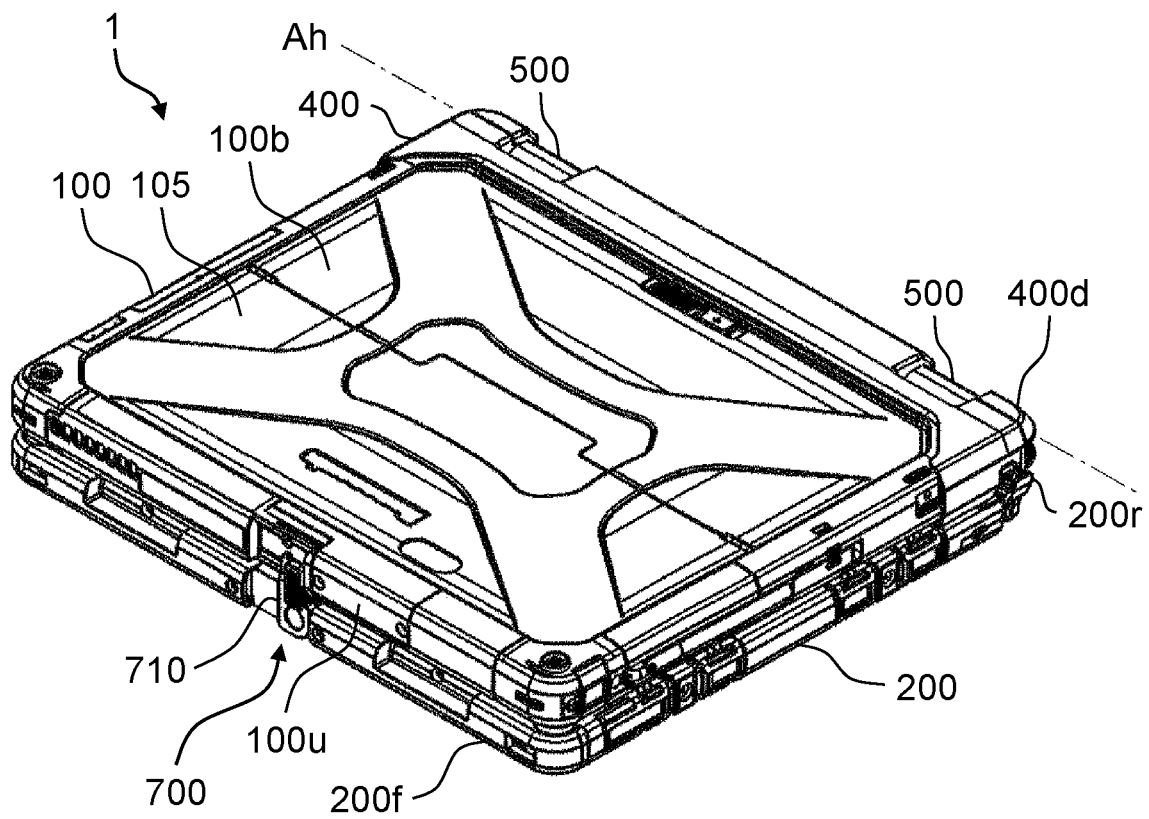
FIG. 3 is a perspective view of the computer and illustrates a state in which the tablet unit is closed.

FIGS. 1, 2, and 3 are perspective views of a computer according to the first exemplary embodiment. FIG. 1 illustrates a state in which tablet unit 100 is attached to keyboard unit 200. FIG. 2 illustrates a state in which tablet unit 100 is detached from keyboard unit 200. FIG. 3 illustrates a state in which tablet unit 100 is closed. In the drawings, directions are given as appropriate for convenience for the purpose of explanation and easier understanding. The directions are based on directions viewed by a user when computer 1 is utilized in a general utilization mode, but it is not intended that computer 1 should be used and disposed in these directions. In FIGS. 1 and 2, a left-right direction corresponds to a device width direction of tablet unit 100 and keyboard unit 200. Further, an up-down direction substantially corresponds to a device depth direction of tablet unit 100 and corresponds to a device thickness direction of keyboard unit 200. Further, a front-rear direction substantially corresponds to a device thickness direction of tablet unit 100 and corresponds to a device depth direction of keyboard unit 200.

Computer 1 has tablet unit 100 and keyboard unit 200. Tablet unit 100 is an example of a first electronic device. Keyboard unit 200 is an example of a second electronic device.

Tablet unit 100 includes display 101 on front surface 100a (first principal surface). Display 101 is composed of, for example, a liquid crystal display panel. Further, display 101 has a touch panel capable of receiving touch operation by a user. Various electronic components such as a central processing unit (CPU), a volatile storage device (RAM), a non-volatile storage device (e.g., ROM and SSD), and a communication module are contained in tablet unit 100. These electronic components are examples of first electronic components. Furthermore, a detachable battery that supplies electric power to these electronic components is contained in tablet unit 100. Openable cover 105 is provided on rear surface 100b of tablet unit 100 (see FIG. 3), and the battery can be detached by opening cover 105. In the nonvolatile storage device (such as the ROM and the SSD), an operating system (OS), various application programs, various data, and the like are stored. The central processing unit (CPU) reads the OS, the application programs, and the various data and performs arithmetic processing to achieve various functions in computer 1.

A housing of tablet unit 100 is made of, for example, resin or metal such as a magnesium alloy.

Holder 400 is coupled to keyboard unit 200 via hinges 500.

Keyboard unit 200 includes keyboard 201, touch pad 202, operation buttons 203, and the like on upper surface 200a (second principal surface). Further, keyboard unit 200 has an interface for transmitting and receiving data to and from tablet unit 100 and an external device interface for connection with an external device. Various electronic components such as a keyboard controller and a touch pad controller are contained in keyboard unit 200. These electronic components are examples of second electronic components.

A housing of keyboard unit 200 is made of, for example, resin or metal such as a magnesium alloy.

As illustrated in FIG. 2, holder 400 is coupled to side surface 200r on a rear side of keyboard unit 200 (hereinafter referred to as "rear side surface 200r" as appropriate) via hinges 500. As illustrated in FIG. 1, holder 400 can attach tablet unit 100. Further, as illustrated in FIG. 2, holder 400 can detach tablet unit 100 by operating operation member 420.

Hinges 500 couple rear side surface 200r of keyboard unit 200 and side surface 400d on a lower side of holder 400 (hereinafter referred to as "lower side surface 400d" as appropriate). By hinges 500, keyboard unit 200 and holder 400 are relatively rotatable around rotation axis Ah parallel to a device width direction (left-right direction in FIG. 1) of computer 1. Note that this also means that hinges 500 couple rear side surface 200r of keyboard unit 200 and side surface 100d on a lower side of tablet unit 100 attached to holder 400 (hereinafter referred to as "lower side surface 100d" as appropriate). By hinges 500, keyboard unit 200 and tablet unit 100 are relatively rotatable around rotation axis Ah parallel to the width direction of computer 1. For example, as illustrated in FIG. 1, hinges 500 can allow tablet unit 100 to be opened at an angle of about 100 degrees with respect to keyboard unit 200. Also, as illustrated in FIG. 3, hinges 500 can allow tablet unit 100 to be closed with respect to keyboard unit 200. In the closed state, front surface 100a of tablet unit 100 and upper surface 200a of keyboard unit 200 closely face and are substantially parallel to each other.

Holder 400 is provided with connector 460 (see FIG. 5A) that is connected with connector 140 (see FIG. 4) of tablet unit 100 with tablet unit 100 attached to holder 400. Various signals and electric power are given and received between tablet unit 100 and keyboard unit 200 via these connectors 140, 460. For example, signals output from keyboard 201, touch pad 202, the plurality of operation buttons 203, and the like, of keyboard unit 200 can be output to tablet unit 100. Tablet unit 100 can receive these signals and perform control based on the received signals. Therefore, computer 1 can be utilized as a notebook type computer by attaching tablet unit 100 to keyboard unit 200. Further, tablet unit 100 can be utilized alone as a tablet type computer.

Additionally, computer 1 is provided with latch mechanism 700 that locks tablet unit 100 in keyboard unit 200 with tablet unit 100 closed by facing keyboard unit 200. Latch mechanism 700 is configured such that upper side surface 100u of tablet unit 100 and front side surface 200f of keyboard unit 200 are locked by latch 710.

[1-2. Lock Mechanism]

Computer 1 of the present exemplary embodiment includes a lock mechanism for preventing tablet unit 100 attached to holder 400 from being detached from holder 400. The lock mechanism will be described below in detail.

[1-2-1. Tablet Unit Side]

FIG. 4 is a perspective view of a rear side of tablet unit 100 (tablet computer). Engaging target parts 130 are provided on lower side surface 100d of tablet unit 100. Engaging target parts 130 are capable of engaging with engagement members 443 (see FIG. 5A) of engagement parts 440 configuring the lock mechanism of holder 400. Two engaging target parts 130 are provided on lower side surface 100d spaced apart from each other in the width direction of tablet unit 100.

[1-2-2. Holder Side]

Figure 6A:
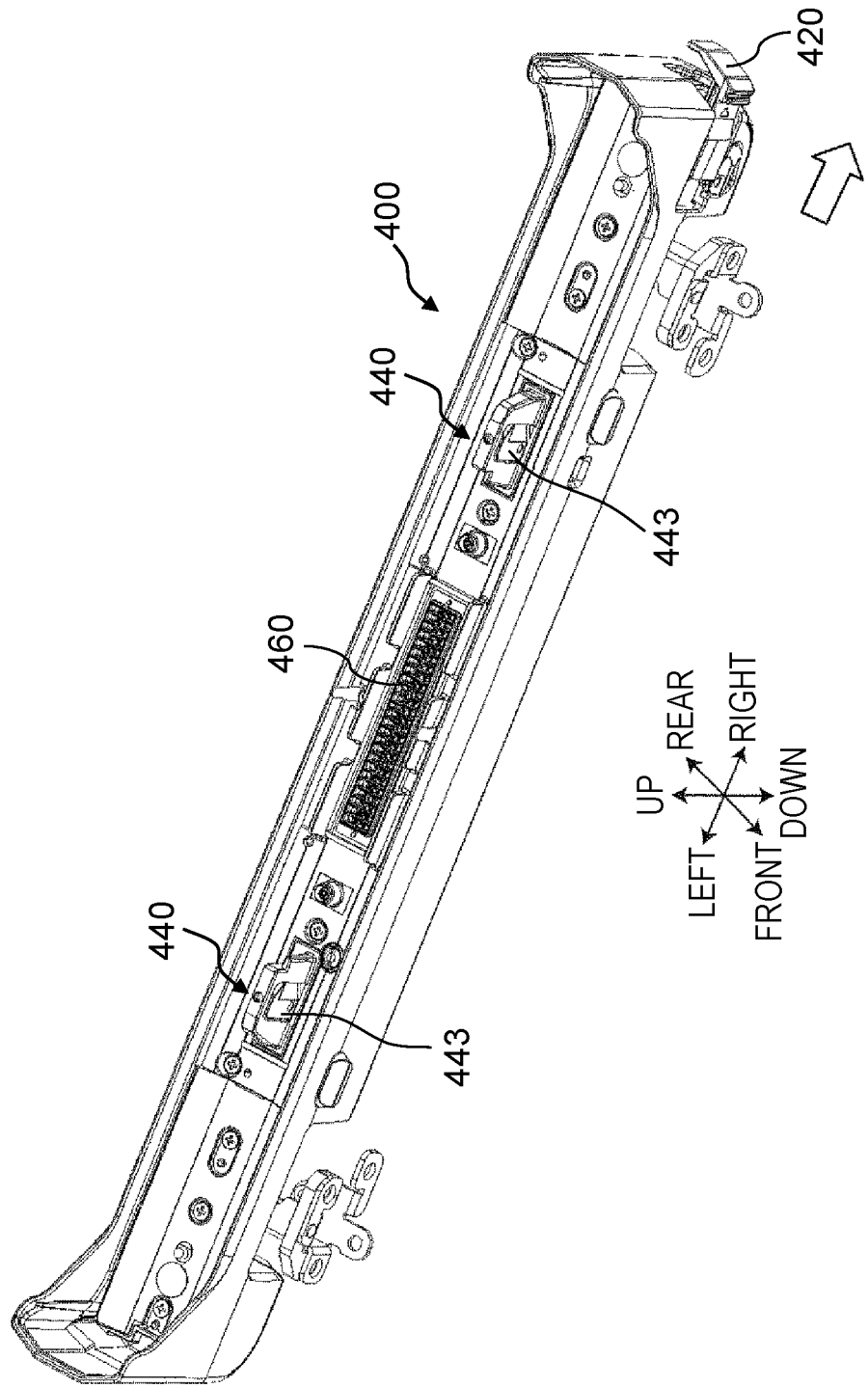
FIG. 6A is a perspective view of the holder and illustrates a state in which the engagement members are located at second rotational positions.
Figure 6B:
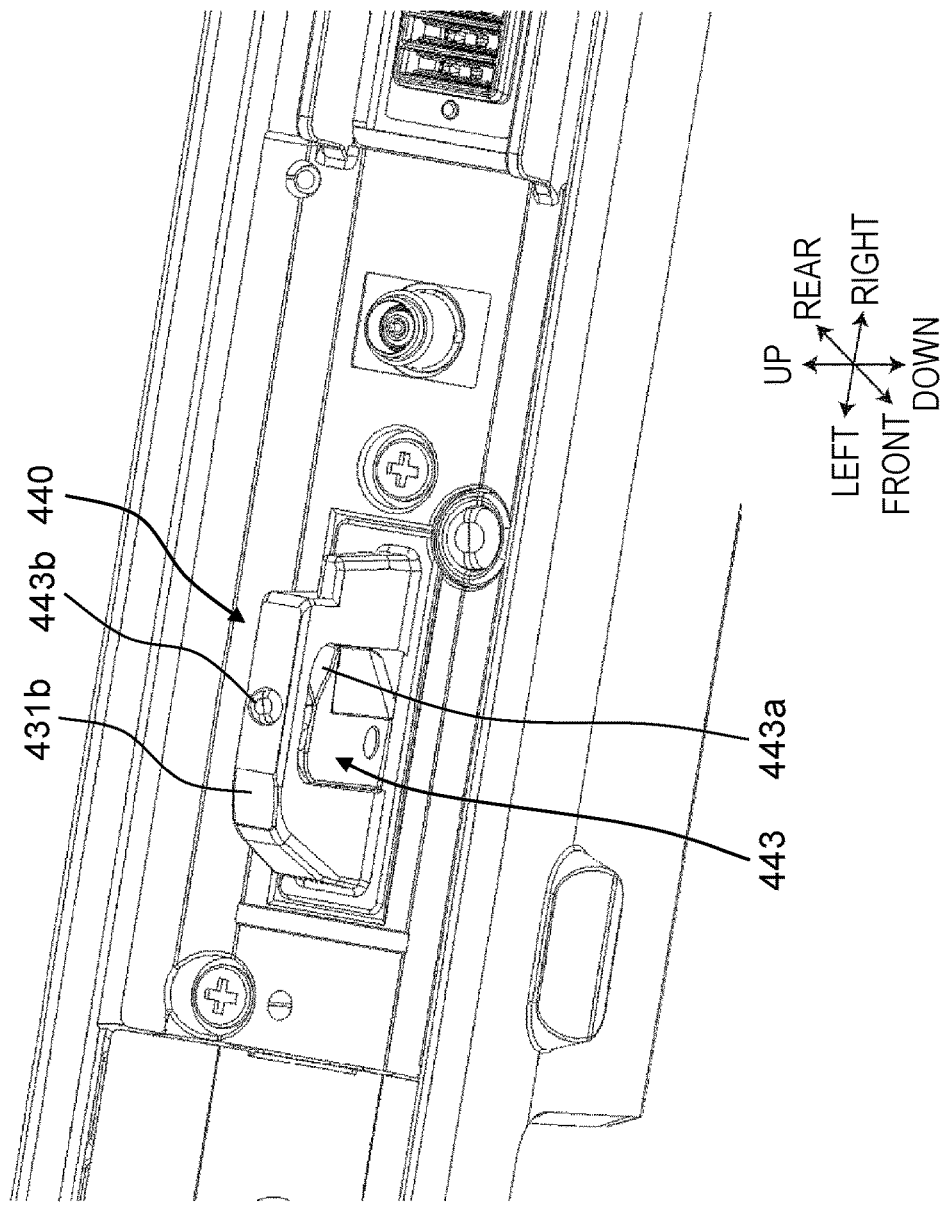
FIG. 6B is an enlarged perspective view of the engagement member when the engagement member is located at the second rotational position.

FIGS. 5A and 6A are perspective views of holder 400. FIG. 5A illustrates a state in which engagement members 443 are located at first rotational positions. FIG. 6A illustrates a state in which engagement members 443 are located at second rotational positions. FIG. 5B is an enlarged perspective view of engagement member 443 when engagement member 443 is located at the first rotational position. FIG. 6B is an enlarged perspective view of engagement member 443 when engagement member 443 is located at the second rotational position.

Holder 400 includes case 410, operation member 420, engagement parts 440, and a drive mechanism (not illustrated).

As illustrated in FIG. 5A, holder 400 has a boat shape extending in the width direction of computer 1 and includes recess 400y into which lower side surface 100d of tablet unit 100 can be fit.

Engagement parts 440 are formed to be engageable with engaging target parts 130 of tablet unit 100. Engagement parts 440 each have engagement member 443. As will be detailed later, engagement members 443 are each formed to be rotatable about a rotation axis (an axis of rotation shaft 443b) that is parallel to an up-down direction of holder 400. Two engagement members 443 are each provided on an upper surface of base 431a of support member 431 and are spaced apart from each other along a longitudinal direction (device width direction) of holder 400. Two engagement members 443 are each disposed to have a positional relationship engageable with engaging target part 130 of tablet unit 100 when lower side surface 100d of tablet unit 100 is fitted into holder 400. Engagement members 443 are each disposed to project upward beyond the upper surface of base 431a of support member 431.

Engagement members 443 located at the first rotational positions engage with engaging target parts 130. The first rotational position is a rotational position where engagement projections 443a of engagement member 443 protrude to a front side and a rear side from a front surface and a rear surface of engagement member support 431b of support member 431, respectively. Further, engagement members 443 rotated to the second rotational positions are disengaged from engaging target parts 130. The second rotational position is a rotational position where engagement projections 443a of engagement member 443 do not protrude to the front side and the rear side from the front surface and the rear surface of engagement member support 431b of support member 431, respectively. Operation of operation member 420 is transmitted to engagement members 443 via the drive mechanism. When operation member 420 is moved from a first position illustrated in FIG. 5A to a second position illustrated in FIG. 6A, engagement members 443 rotate from the first rotational positions to the second rotational positions.

[1-2-3. Disposition of Operation Member]

Figure 7:
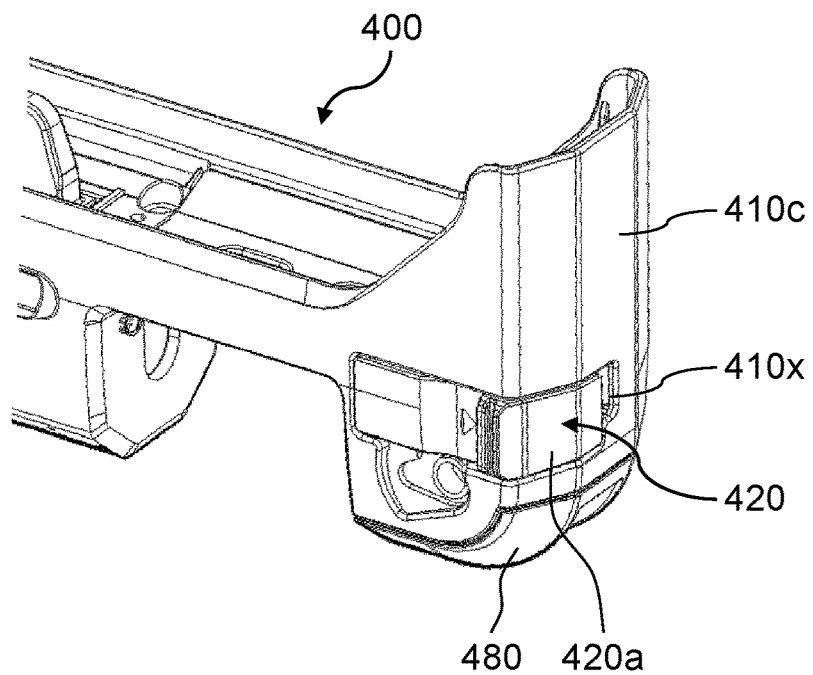
FIG. 7 is an enlarged perspective view of a right end in a longitudinal direction of the holder.

FIG. 7 is an enlarged perspective view of a right end in the longitudinal direction of holder 400. Operation member 420 is disposed at right end 410c in the longitudinal direction of holder 400 and moves parallel to the longitudinal direction of holder 400 between the first position and the second position. The first position is a position where operation member 420 is substantially flush with an exterior of end 410c in the longitudinal direction of holder 400. The second position is a position where operation member 420 protrudes from the exterior of end 410c of holder 400 in the longitudinal direction.

At end 410c of holder 400 (case 410), insertion hole 410x capable of inserting an insertion member of a so-called Kensington lock device is provided adjacent to operation member 420. Accordingly, when the insertion member of the Kensington lock device is inserted into insertion hole 410x, a body of the Kensington lock device can be approached to (abutted on) end 410c and operation member 420 of holder 400. As a result, when the Kensington lock device is fastened, it is impossible to move operation member 420 to the second position.

Figure 8:
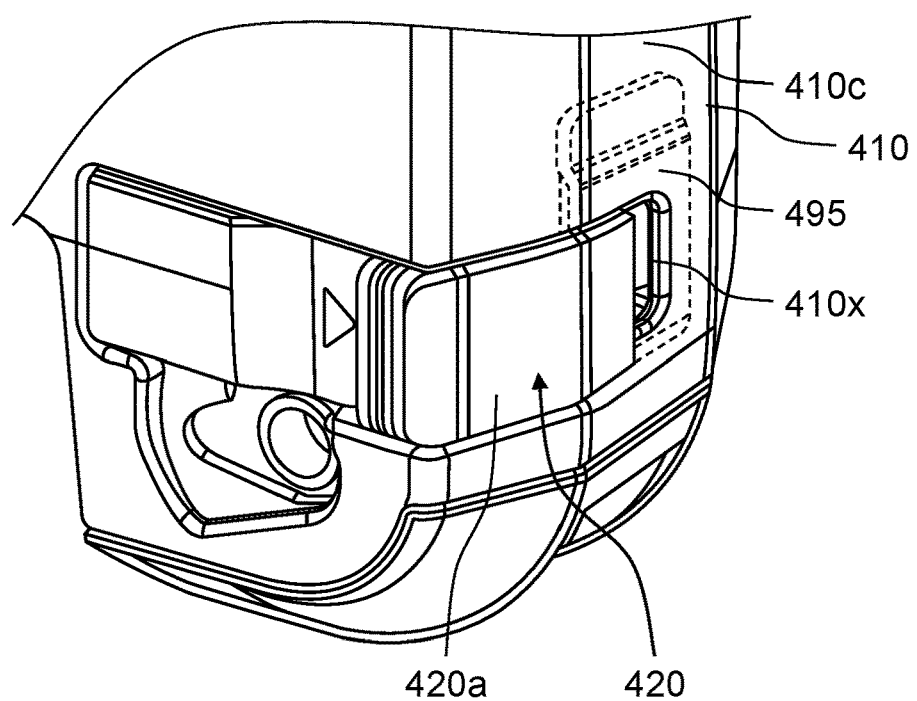
FIG. 8 is an enlarged perspective view illustrating the right end in the longitudinal direction of the holder in a partially see-through manner.

FIG. 8 is an enlarged perspective view illustrating right end 410c in the longitudinal direction of holder 400 in a partially see-through manner. Reinforcing plate 495 surrounding a periphery of insertion hole 410x is disposed inside case 410 of holder 400. Reinforcing plate 495 is formed of an iron plate or stainless steel sheet, and prevents insertion hole 410x of case 410 made of a magnesium alloy from being chipped due to abutment or the like during insertion of the insertion member of the Kensington lock device.

[1-3. External Locking Device]

Figure 9:
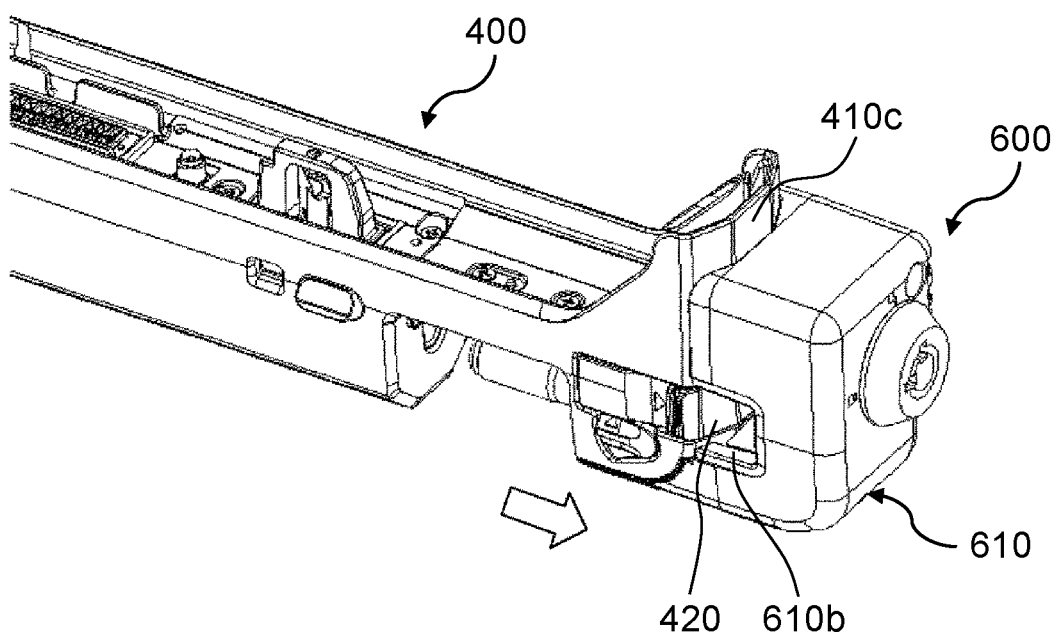
FIG. 9 is a perspective view of the holder on which an external locking device is mounted.
Figure 10:
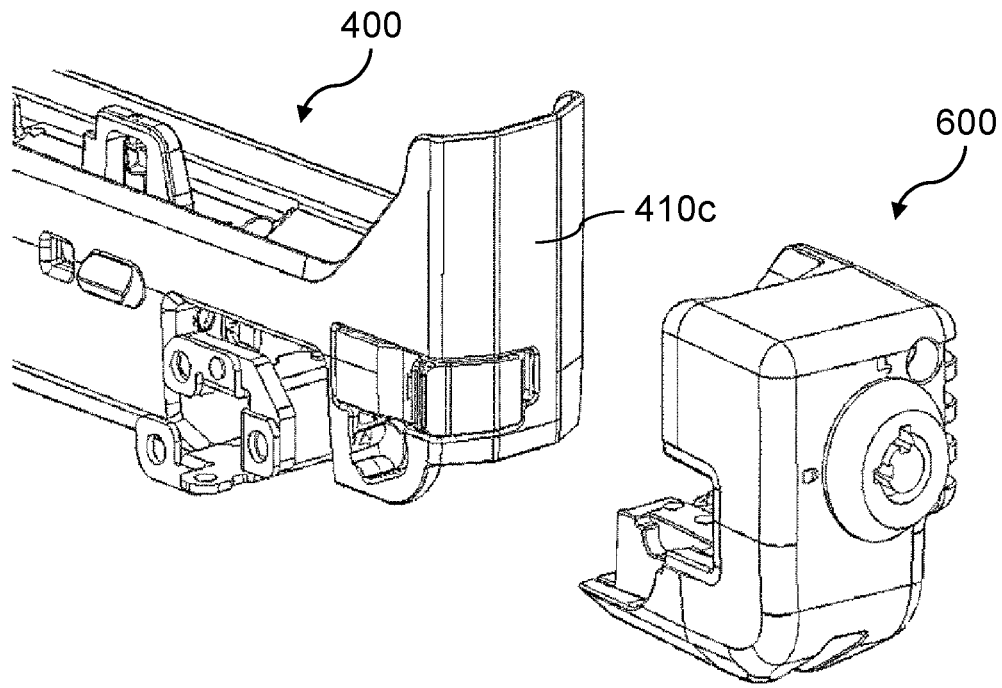
FIG. 10 is a perspective view of the holder from which the external locking device is detached.

FIG. 9 is a perspective view of holder 400 on which external locking device 600 is mounted. FIG. 10 is a perspective view of holder 400 from which external locking device 600 is detached. As illustrated in FIG. 9, external locking device 600 is attachable to holder 400 of the present exemplary embodiment as an option.

External locking device 600 is mounted on end 410c of holder 400. External locking device 600 regulates movement of operation member 420 to the second position to thereby prevent unlocking. Note that when external locking device 600 is mounted on holder 400, as illustrated in FIG. 9, external locking device 600 is mounted in place of bottom plate 480 (see FIG. 7) at end 410c of holder 400.

Figure 11:
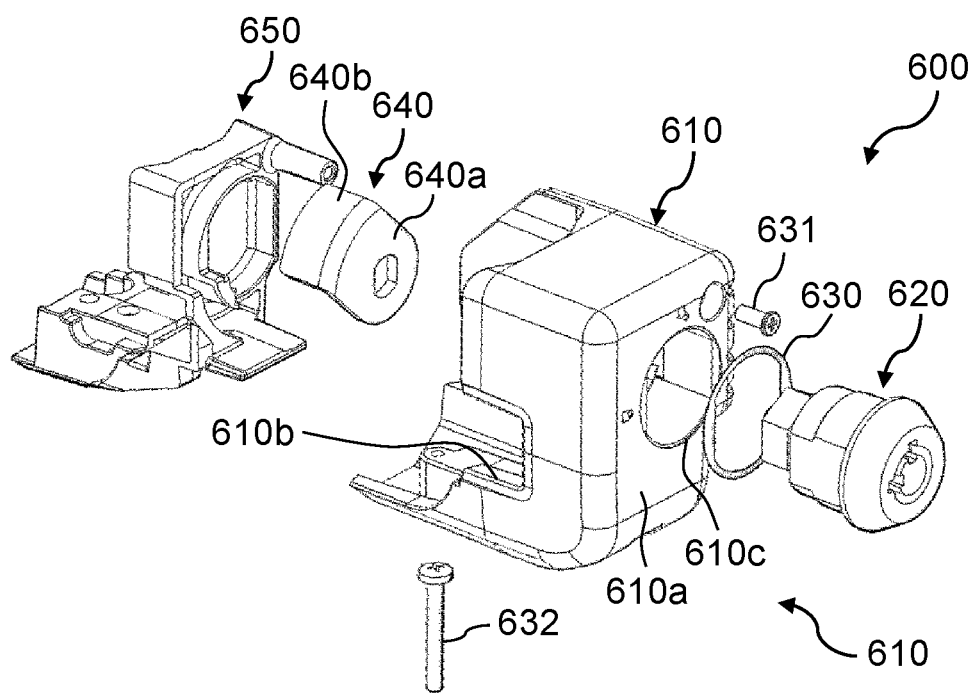
FIG. 11 is an exploded perspective view of the external locking device.

FIG. 11 is an exploded perspective view of external locking device 600. External locking device 600 has case 610, locking member 620, washer 630, moving member 640, and mount 650.

Main body 610a of case 610 has a surface on which locking member 620 is mounted. This surface is provided with mounting hole 610c for mounting locking member 620. Further, operation member moving recess 610b is provided on a side surface of main body 610a of case 610. Operation member moving recess 610b has a shape in which operation part 420a provided at an end of operation member 420 fits. Case 610 is, for example, formed of a magnesium alloy.

Figure 12A:
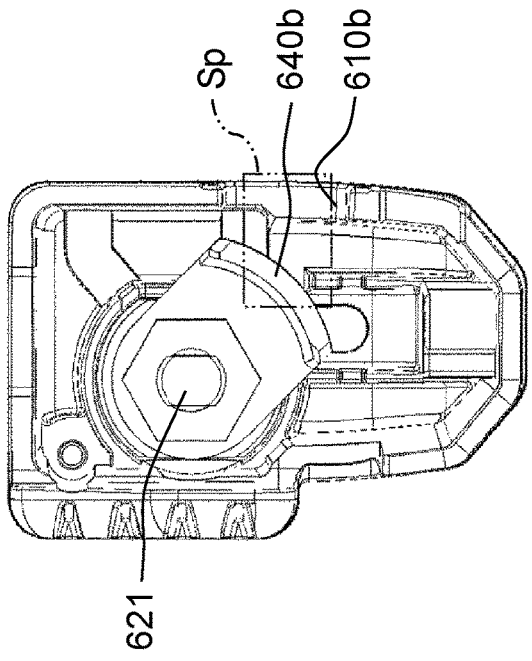
FIG. 12A is a movement description view of a moving member of the external locking device and illustrates a state during unlocking of the external locking device.

Locking member 620 is constituted of a cylinder lock that can take an unlocked state and a locked state by inserting and rotating a key. Locking member 620 has shaft member 621 (see FIGS. 12A and 12C) that rotates interlocking with the rotation of the key.

Moving member 640 has mounting plate 640a and rotating plate 640b perpendicular to mounting plate 640a, and has a substantially L-shaped cross-sectional shape. Mounting plate 640a is fixed to shaft member 621 of locking member 620. Moving member 640 is formed of a metal plate such as a stainless steel sheet.

Case 610 is mounted on mount 650. Mount 650 is formed of metal such as a magnesium alloy.

Figure 12B:
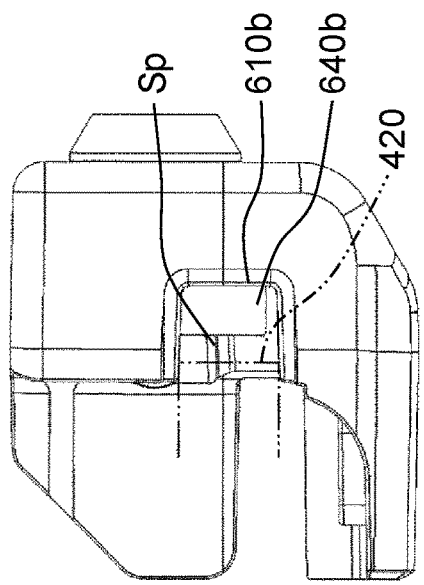
FIG. 12B is a movement description view of the moving member of the external locking device and illustrates a state during the unlocking of the external locking device.
Figure 12C:
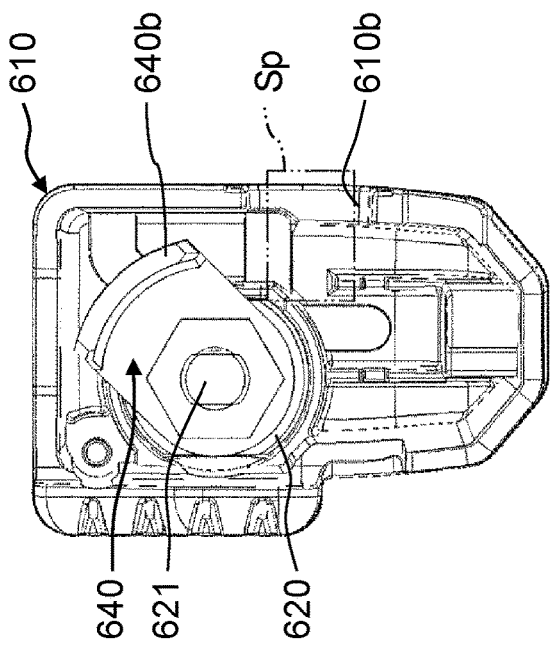
FIG. 12C is a movement description view of the moving member of the external locking device and illustrates a state during locking of the external locking device.
Figure 12D:
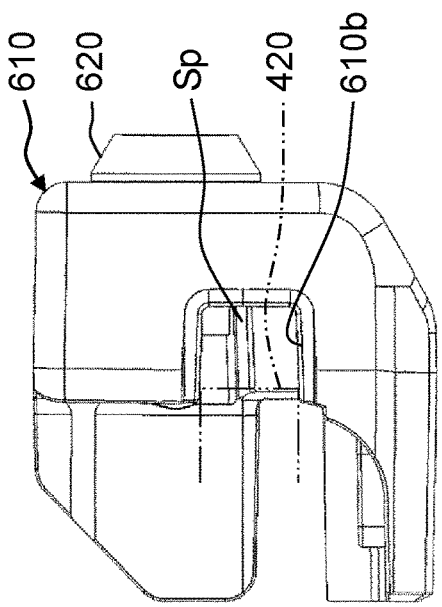
FIG. 12D is a movement description view of the moving member of the external locking device and illustrates a state during the locking of the external locking device.
Figure 13A:
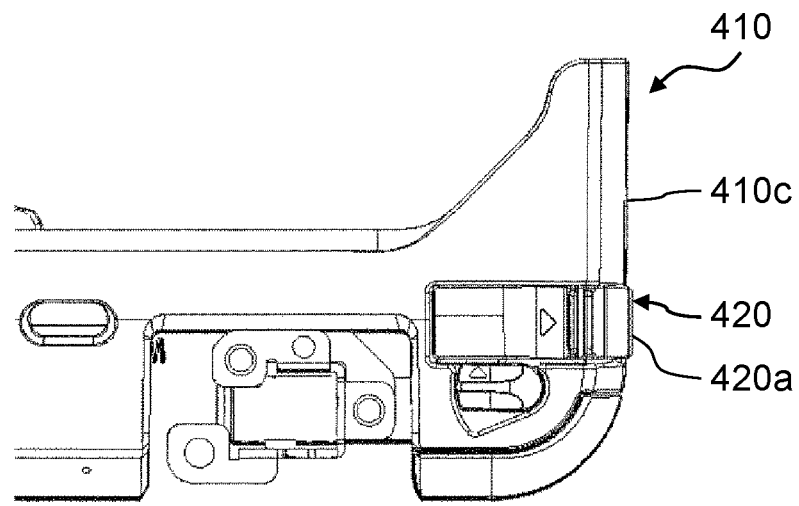
FIG. 13A is a movement description view of an operation member of the holder and illustrates a state when the operation member is located at a first position.
Figure 13B:
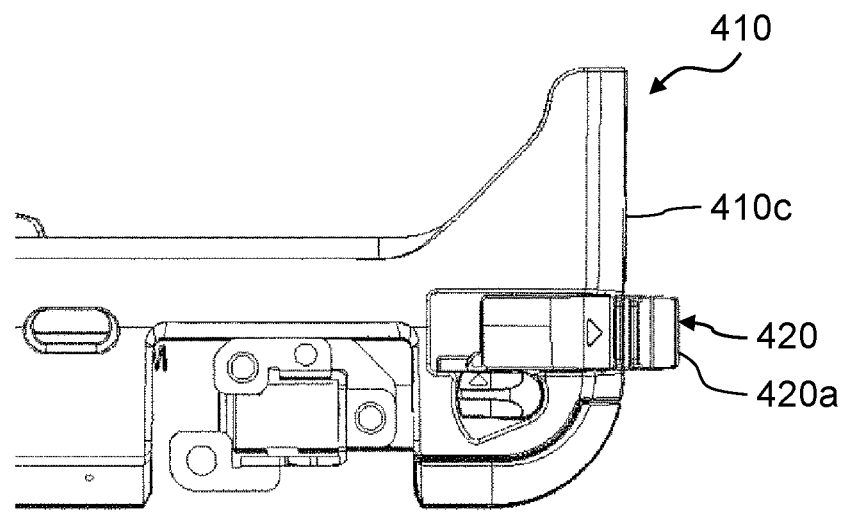
FIG. 13B is a movement description view of the operation member of the holder and illustrates a state when the operation member is located at a second position.

FIGS. 12A, 12B, 12C, and 12D are movement description views of moving member 640 of external locking device 600. FIGS. 13A and 13B are movement description views of operation member 420 of holder 400. Shaft member 621 of locking member 620 rotates to a locking position illustrated in FIG. 12C during locking of locking member 620 and rotates to an unlocking position illustrated in FIG. 12A during unlocking of locking member 620. When shaft member 621 is located at the locking position, as illustrated in FIG. 12D, moving member 640 (more specifically, rotating plate 640b) moves to space Sp where operation member 420 (more specifically, operation part 420a (see FIG. 13B)) is to be located at the second position. Accordingly, operation member 420 cannot be moved to space Sp in operation member moving recess 610b. Further, when shaft member 621 is located at the unlocking position, as illustrated in FIG. 12B, moving member 640 (more specifically, rotating plate 640b) retreats from space Sp where operation member 420 (more specifically, operation part 420a) is to be located at the second position. As a result, moving member 640 can be moved to space Sp in operation member moving recess 610b. Thus, in the present exemplary embodiment, it is impossible to detach tablet unit 100 attached to holder 400 of keyboard unit 200 without using a Kensington lock.

[1-4. Mounting of External Locking Device on Holder]

In the present exemplary embodiment, external locking device 600 cannot be detached from holder 400 with tablet unit 100 attached to holder 400. A method for mounting external locking device 600 on holder 400 will be described below.

Figure 14:
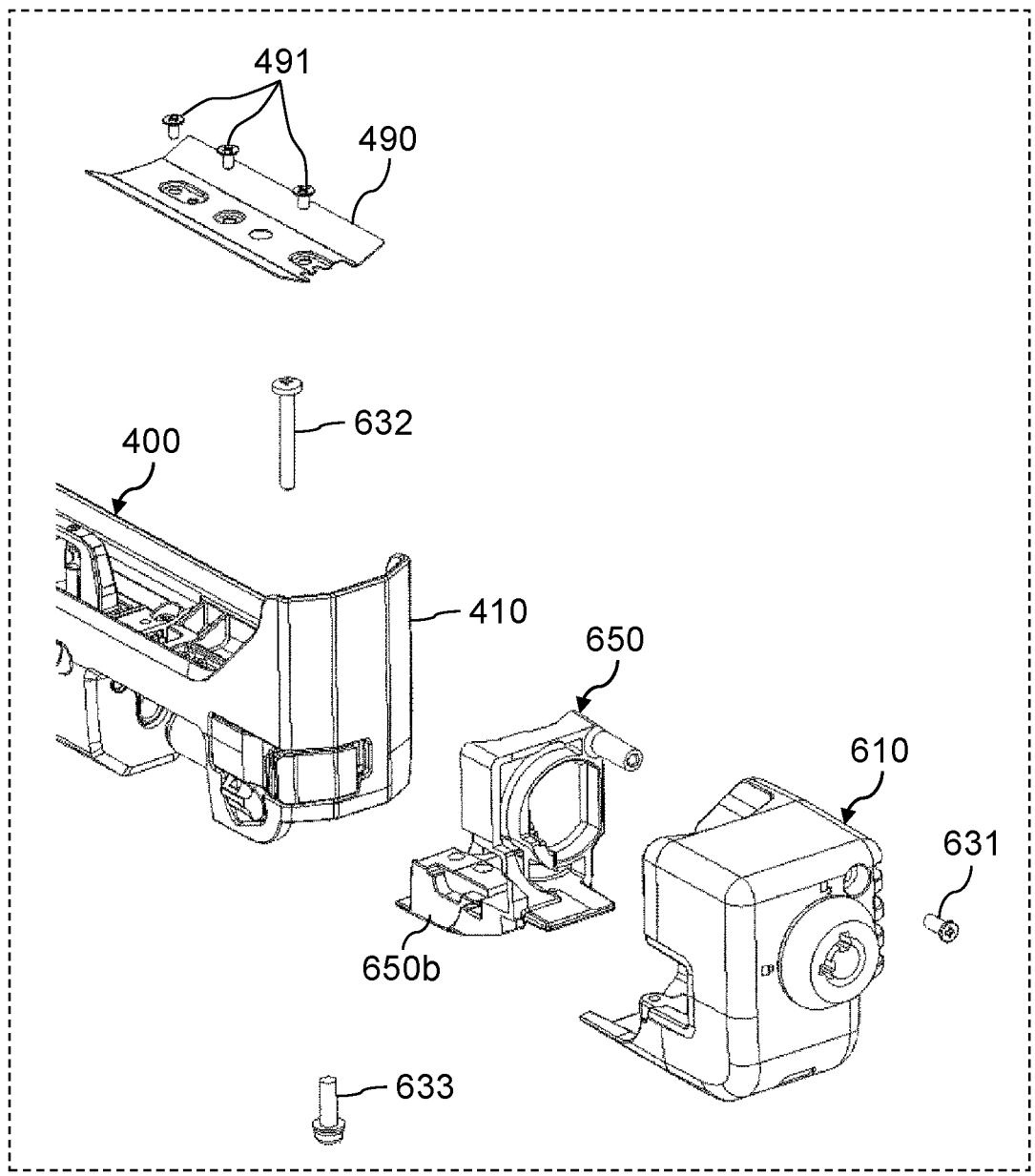
FIG. 14 is a view for describing a method for mounting the external locking device on the holder (part 1).
Figure 15:
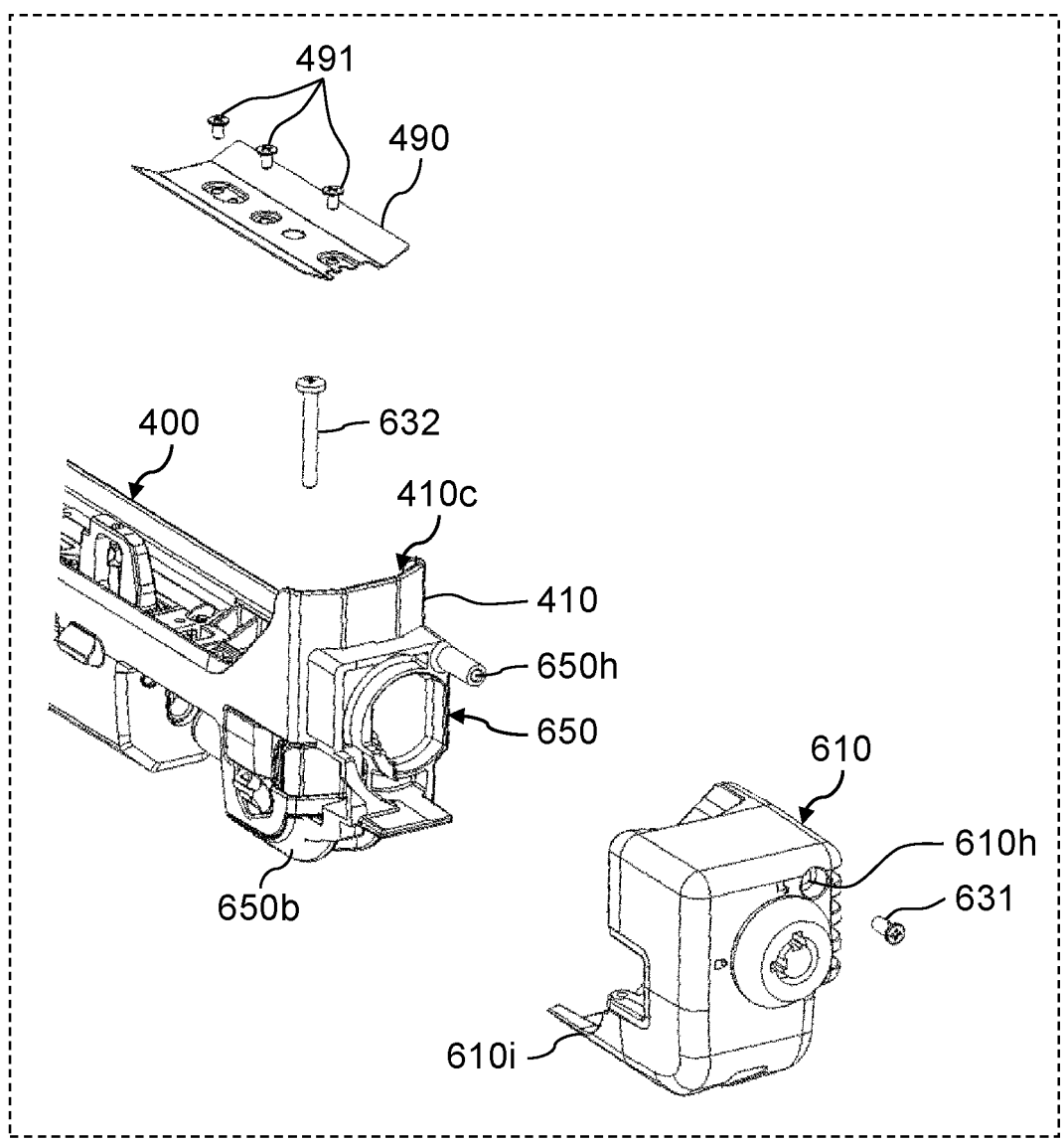
FIG. 15 is a view for describing the method for mounting the external locking device on the holder (part 2).

FIGS. 14 and 15 are views for describing the method for mounting external locking device 600 on holder 400.

First, bottom plate 480 (see FIG. 7) at end 410c of holder 400 is detached as illustrated in FIG. 14 (FIGS. 14 and 15 illustrate detached states).

Next, as illustrated in FIG. 15, mount 650 is fixed to case 410 of holder 400. Specifically, mounting part 650b (see FIG. 14) of mount 650 is located on a lower surface side of end 410c of case 410 as illustrated in FIG. 15, screw 633 (see FIG. 14) is inserted into a screw hole (not illustrated) of mounting part 650b, and a tip of screw 633 is screwed into a screw hole (not illustrated) on a lower surface of end 410c of case 410.

Next, case 610 in which locking member 620, washer 630, and moving member 640 are previously assembled is fixed to mount 650. Specifically, case 610 is located on a front side of mount 650, screw 631 is inserted into screw hole 610h, and a tip of screw 631 is screwed into screw hole 650h of mount 650. At this time, mounting part 650b of mount 650 is covered with lower surface 610i of case 610. As a result, it is impossible to access screw 633 (see FIG. 14) for fixing mount 650 to case 410 of holder 400 from outside.

Next, case 410 of holder 400, mounting part 650b of mount 650, and lower surface 610i of case 610 of external locking device 600 are tightened together from above by screw 632. Accordingly, even when screw 631 that fixes case 610 of external locking device 600 to mount 650 is removed, case 610 of external locking device 600 is not detached from mount 650.

Next, upper surface plate 490 of holder 400 is fixed to case 410 of holder 400 by screws 491. As a result, mounting of external locking device 600 to holder 400 is completed. At this time, above-described screw 632 for tightening together is hidden by upper surface plate 490 as illustrated in FIG. 5A, and it is impossible to access screw 632 from the outside.

Herein, when tablet unit 100 is attached to holder 400, screws 491 of upper surface plate 490 of holder 400 are hidden by tablet unit 100. Accordingly, it is impossible to access screws 491 of upper surface plate 490 of holder 400 from the outside.

Furthermore, when external locking device 600 is locked, operation member 420 cannot move, thereby making it impossible to detach tablet unit 100. Further, since tablet unit 100 cannot be detached, screws 491 of upper surface plate 490 of holder 400 cannot be accessed at all from the outside. Therefore, it is impossible to detach external locking device 600 from holder 400.

Another Example

In the above exemplary embodiment, holder 400 is coupled to keyboard unit 200 via hinges 500. However, holder 400 may be coupled to a base member of a car mount holder via hinges 500. Since the car mount holder is normally fixed to a vehicle, holder 400 cannot be detached from the vehicle. Therefore, when holder 400 is provided with above-described external locking device 600, tablet unit 100 can be fixed to the vehicle via the car mount holder having holder 400 without using a Kensington lock or the like. Further, by locking external locking device 600, tablet unit 100 cannot be detached from holder 400, thereby generating a state similar to a state in which tablet unit 100 is substantially fixed to the vehicle. As a result, security against theft or the like of tablet unit 100 is greatly improved.

[2. Effects and Other Benefits]

External locking device 600 of the present exemplary embodiment is attached to holder 400 of keyboard unit 200 (an example of a second electronic device), to which tablet unit 100 (an example of a first electronic device) is detachably attached.

Holder 400 includes operation member 420 for detaching tablet unit 100.

Operation member 420 is movable between a first position where operation member 420 is substantially flush with an exterior of holder 400 and a second position where operation member 420 protrudes from the exterior of holder 400.

Holder 400 is detachable from tablet unit 100 when operation member 420 is operated to move from the first position to the second position.

External locking device 600 includes locking member 620, shaft member 621 that rotates to a locking position during locking of locking member 620 and rotates to an unlocking position during unlocking of locking member 620, and moving member 640 coupled to shaft member 621 of locking member 620.

When shaft member 621 is located at the locking position, moving member 640 moves to space Sp where operation member 420 is to be located at the second position, and when shaft member 621 is located at the unlocking position, moving member 640 retreats from space Sp.

As a result, it is impossible to detach tablet unit 100 attached to holder 400 of keyboard unit 200 without using a Kensington lock.

In the present exemplary embodiment, operation member 420 is disposed at end 410c in a longitudinal direction of holder 400 and moves parallel to the longitudinal direction.

The first position is a position where operation member 420 is substantially flush with an exterior of end 410c of holder 400.

The second position is a position where operation member 420 protrudes from the exterior of end 410c of holder 400 in the longitudinal direction.

External locking device 600 is mounted on end 410c of holder 400.

As a result, external locking device 600 can be mounted on holder 400 without being protruded from a front side or a rear side of holder 400.

Another Exemplary Embodiment

The first exemplary embodiment has been described above as an example of the technique disclosed in the present disclosure. However, the technique of the present disclosure is not limited to the first exemplary embodiment, and also applicable to other exemplary embodiments that undergo some modifications, replacements, additions, and omissions, for example, as appropriate. In addition, new exemplary embodiments can also be achieved by combining the respective components described in the first exemplary embodiment. Thus, another exemplary embodiment will be described below as an example.

(1) In the above exemplary embodiment, operation member 420 is disposed at end 410*c* in the longitudinal direction of holder 400 and moves parallel to the longitudinal direction. In addition, external locking device 600 is mounted on end 410*c* of holder 400. However, the external locking device of the present disclosure may be mounted on a portion of the holder other than the end in the longitudinal direction.

As described above, the exemplary embodiments have been described as examples of the technique of the present disclosure. For that purpose, the accompanying drawings and the detailed description have been provided. The components illustrated in the accompanying drawings and described in the detailed description may include components essential for solving the problems, as well as components that are not essential for solving the problems but required to exemplify the above techniques. For this reason, it should not be immediately recognized that those unnecessary components are necessary just because those unnecessary components are described in the accompanying drawings and the detailed description. Also, since the aforementioned exemplary embodiments are for describing the technologies of the present disclosure as an example, various modifications, replacements, additions, omissions, and the like may be made within the scope of the claims or a scope equivalent thereto.

INDUSTRIAL APPLICABILITY

The present disclosure is widely applicable to an electronic device in which a first electronic device can be freely detached from a holder of a second electronic device.

What is claimed is:

1. An external locking device mounted on a holder of a second electronic device, the holder being detachably attached with a first electronic device,
   the holder including an operation member for detaching the first electronic device from the holder,
   the operation member being moved between a first position where the operation member is substantially flush with an exterior of the holder and a second position where the operation member protrudes from the exterior of the holder,
   the holder causing the first electronic device to be detached from the holder when the operation member is operated to move from the first position to the second position,
   the external locking device comprising:
   a locking member;
   a shaft member that rotates to a locking position during locking of the locking member and rotates to an unlocking position during unlocking of the locking member; and
   a moving member coupled to the shaft member,
   wherein
   when the shaft member is located at the locking position, the moving member moves to a space where the operation member is to be located at the second position, and
   when the shaft member is located at the unlocking position, the moving member retreats from the space.

2. The external locking device according to claim 1, wherein
   the operation member is disposed at an end of the holder in a longitudinal direction of the holder and moves parallel to the longitudinal direction,
   the first position is a position where the operation member is substantially flush with the exterior of the end of the holder,
   the second position is a position where the operation member protrudes from the exterior of the end of the holder in the longitudinal direction, and
   the external locking device is mounted on the end of the holder.

* * * * *